United States Patent [19]

Tokizaki et al.

[11] Patent Number: 5,528,114

[45] Date of Patent: Jun. 18, 1996

[54] APPARATUS FOR DRIVING TWO MOTORS

[75] Inventors: Hisashi Tokizaki, Oura-machi; Naoto Tsukui, Ohta, both of Japan

[73] Assignee: Sanyo Electric Co., Ltd., Osaka, Japan

[21] Appl. No.: 149,930

[22] Filed: Nov. 10, 1993

[30] Foreign Application Priority Data

Nov. 27, 1992 [JP] Japan .................... 4-318548

[51] Int. Cl.⁶ .................................. H02P 5/46
[52] U.S. Cl. .................. 318/67; 318/34; 62/228.4
[58] Field of Search ........................ 318/254, 138, 318/439, 792–801, 34, 35, 112, 51, 66–67, 1, 2; 62/228.1, 228.4

[56] References Cited

U.S. PATENT DOCUMENTS

| | | | |
|---|---|---|---|
| 4,061,948 | 12/1977 | Lamparter | 318/112 X |
| 4,257,238 | 3/1981 | Kountz et al. | 62/228 |
| 4,364,237 | 12/1982 | Cooper et al. | 62/228 |
| 4,490,661 | 12/1984 | Brown et al. | 318/254 X |
| 4,667,480 | 5/1987 | Bessler . | |
| 4,698,744 | 10/1987 | Itani et al. | 318/802 X |
| 4,870,833 | 10/1989 | Matsuda et al. | 62/228.4 |
| 5,153,487 | 10/1992 | Hennig | 318/112 X |
| 5,162,709 | 11/1992 | Ohi | 318/254 X |
| 5,210,473 | 5/1993 | Backstrand | 318/63 X |
| 5,365,153 | 11/1994 | Fujita et al. | 318/47 X |

FOREIGN PATENT DOCUMENTS

| | | |
|---|---|---|
| 0085454 | 8/1983 | European Pat. Off. . |
| 3239176 | 10/1991 | Japan . |
| 2083959 | 3/1982 | United Kingdom . |
| 2149237 | 6/1985 | United Kingdom . |

*Primary Examiner*—David S. Martin
*Attorney, Agent, or Firm*—Darby & Darby

[57] ABSTRACT

Plural systems of switching signals are obtained from a single microprocessor for driving a plurality of motors and other apparatuses while achieving effective use of ports of the microprocessor. In principle, three kinds of switching signals based on three-phase are generated in the microprocessor, the three kind of switching signals are converted to six kinds of switching signals in circuits external to the microprocessor, and then the signals are supplied to their respective switching elements in an inverter circuit.

7 Claims, 18 Drawing Sheets

APPARATUS FOR DRIVING TWO MOTORS

BACKGROUND OF THE INVENTION

The present invention relates to a method and an apparatus for driving a motor for use for example in an air conditioner and, more particularly, to generation of switching signals for driving a motor on the basis of a PWM (pulse width modulation) system.

As one of the conventional systems of the described type, there is a system disclosed in the U.S. Pat. No. 4,698,744. The system disclosed in the USP is such that is adapted, in controlling operation (number of revolutions) of a single motor by means of a single microprocessor, to generate six switching signals in the microprocessor and control the operation of the motor with these switching signals.

Since, in the conventional driving method, six switching signals are output from the microprocessor, the microprocessor has to have at least six output ports (terminals) therefor. Hence, when this microprocessor is used also for controlling other electric apparatuses, there arises a problem that the ports become insufficient in number for controlling such other apparatuses.

The present invention was made for solving the above mentioned problem. Accordingly, an object of the present invention is to provide a method and an apparatus for driving a motor in which the difficulty of insufficiency of ports in number is solved.

Another object of the present invention is to drive a plurality of motors and other electric apparatuses with plural sets of outputs based on a PWM system provided by the use of a single microprocessor.

SUMMARY OF THE INVENTION

The method for driving a motor according to the present invention comprises the steps of generating three kinds of switching signals based on a three-phase PWM (pulse-width modulation) system by means of a microprocessor, inverting the switching signals output from the microprocessor by means of inverting circuits, ON/OFF operating switching elements in response to the switching signals inverted by the inverting circuits and the switching signals before being inverted, and driving the motor with DC power obtained through the ON/OFF operations of the switching elements.

In the above described method, each of the inverting circuits is provided with a circuit for delaying, when the switching signal is changed from an OFF signal to an ON signal, the transmission of the ON signal a predetermined period of time.

The above described method further comprises the steps of generating six kinds of switching signals based on a three-phase PWM (pulse-width modulation) system by means of the microprocessor, ON/OFF operating switching elements different from the aforesaid switching elements in response to the six kinds of switching signals output from the microprocessor, and driving a motor different from the aforesaid motor with DC power obtained through the ON/OFF operations of the switching elements.

The microprocessor further controls other electric apparatuses.

In the above described method, the one motor is that for driving a compressor and the other motor is that for driving a blower, and the microprocessor is mounted on the unit on the out door side of a separated type air conditioner, which has a refrigerating cycle having a compressor, a condenser, an expansion device, and an evaporator separately mounted on a unit on the indoor side and a unit on the out door side.

The apparatus for driving a motor according to the present invention, in an air conditioner having a refrigerating cycle having a compressor, a condenser, an expansion device, and an evaporator, comprises a microprocessor outputting switching signals in accordance with predetermined programs stored a ROM in advance, switching elements performing ON/OFF operations in response to the switching signals for supplying electric power based on a PWM (pulse width modulation) theory to a motor for the compressor, and another inverter circuit performing ON/OFF operations in response to other switching signals output from the microprocessor in accordance with the programs for supplying electric power based on a PWM (pulse width modulation) theory to other electric apparatus such as a fan motor.

Further, the apparatus for driving a motor according to the present invention comprises a single microprocessor for generating plural systems of switching signals based on a PWM (pulse width modulation) theory, and plural systems of switching elements responsive to each system of switching signals output from the microprocessor for performing ON-OFF operations, in which DC power obtained by the ON/OFF operation of each system of switching elements is supplied to each of motors and other plural electric apparatuses for driving the same.

DETAILED DESCRIPTION OF THE PREFERRED EMBODIMENTS

Figure 1:
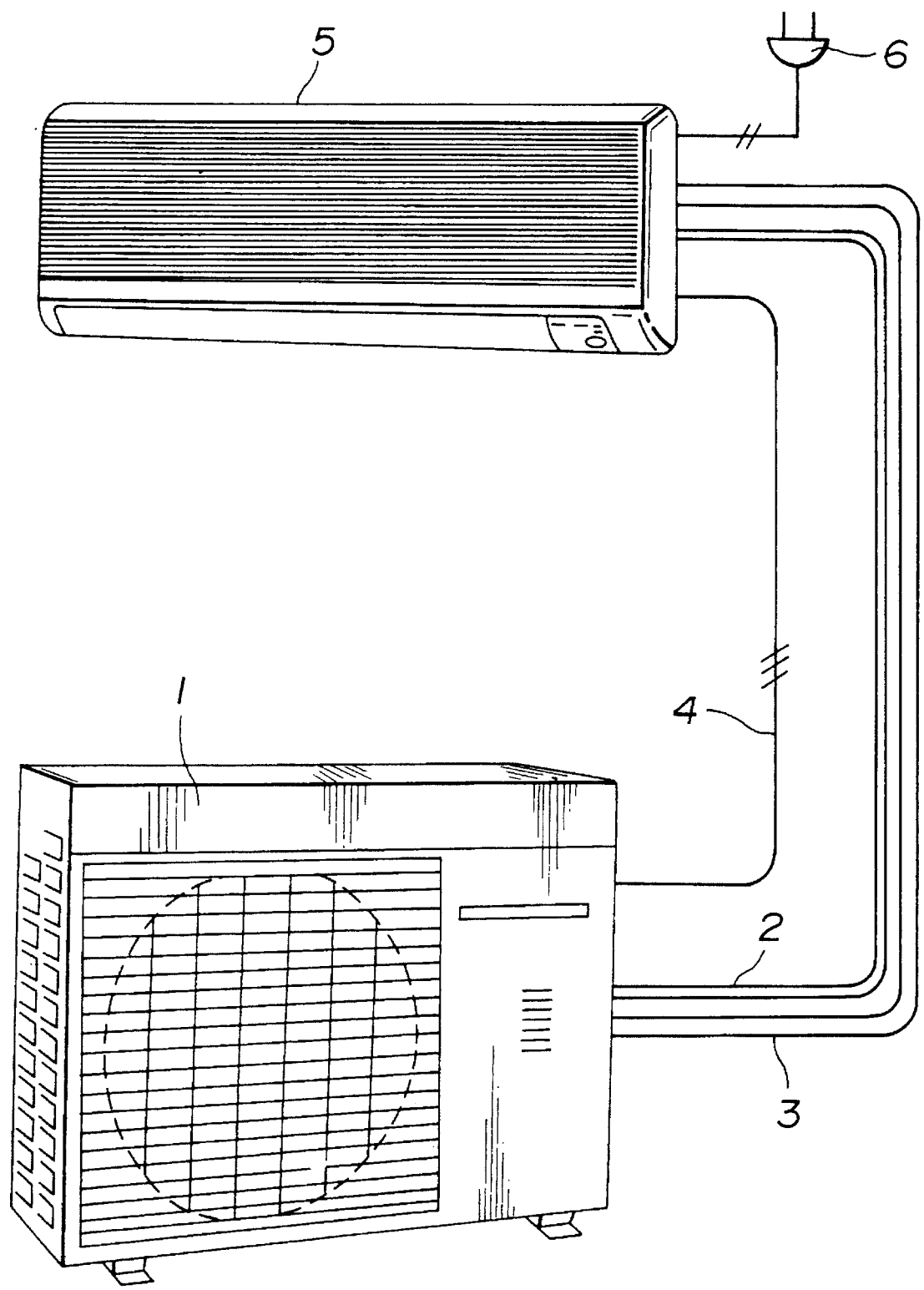
FIG. 1 is a schematic diagram showing an air conditioner constituted of an indoor unit and an outdoor unit, with the present invention applied thereto.

An embodiment of the present invention will be described below with reference to the accompanying drawings. FIG. 1 is a schematic diagram of an air conditioner constituted of an indoor unit and an outdoor unit, to which the present invention is applied. Referring to this diagram, reference numeral 1 denotes an outdoor unit, which is connected with an indoor unit 5 by refrigerant pipings 2 and 3, and an electric line 4. Reference numeral 6 denotes an attachment plug through which AC power from a commercial AC power source is supplied to the air conditioner.

The air conditioner is adapted to control upon receipt of wireless control signals by the indoor unit 5 from a remote controller (not shown).

Figure 2:
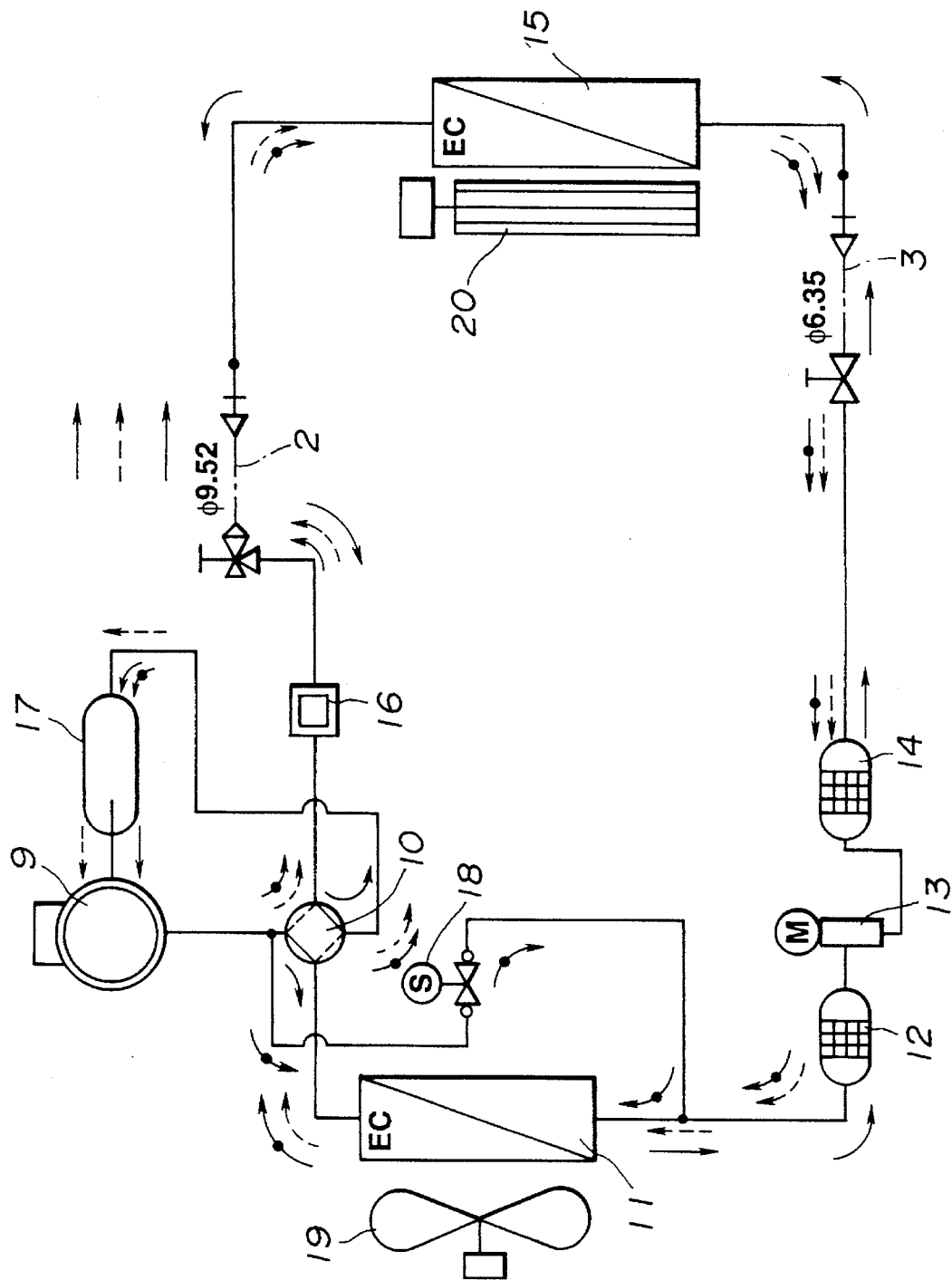
FIG. 2 is a refrigerant circuit diagram showing a refrigeration cycle in the air conditioner shown in FIG. 1.

FIG. 2 is a refrigerant circuit diagram showing a refrigeration cycle in the air conditioner shown in FIG. 1. In this diagram, reference numeral 9 denotes a compressor, 10 denotes a four-way changeover valve, 11 denotes a heat exchanger on the outdoor side, 12 and 14 denote strainers, 13 denotes an expansion device (for example a variable expansion valve changed by a step motor), 15 denotes a heat exchanger on the indoor side, 16 denotes a silencer, and 17 denotes an accumulator, and these members are connected in a refrigerant cycle by refrigerant pipes.

Reference numeral 18 denotes an electromagnetic close/open valve, which when opened allows a refrigerant bypass circuit to be formed. Reference numerals 19 and 20 denote blowers. The blower 19 have a propeller fan for blowing the outdoor side air to the heat exchanger 11 in the outdoor side unit. The blower 20 have a cross-flow fan for blowing the indoor side air to the heat exchanger 15 in the indoor side unit.

In a room cooling operation, a high-temperature and high-pressure refrigerant discharged from the compressor 9 is allowed to flow in the direction indicated by the arrows drawn in solid line. The outdoor heat exchanger 11 effects as a condenser and the indoor heat exchanger 15 effects as an evaporator. Thus, the room cooling operation is operated using the indoor heat exchanger 15.

In a room heating operation, a high-temperature and high-pressure refrigerant discharged from the compressor 9 is allowed to flow in the direction indicated by the arrows drawn in broken line. As a result, the indoor heat exchanger 15 effects as a condenser and the outdoor heat exchanger 11 effects as an evaporator, and thus the room operation is operated using the indoor heat exchanger 15.

In a defrosting operation, the electromagnetic stop valve 18 is opened while the refrigerant flows the same as in the room operation, and hence the refrigerant flows as indicated by the dotted solid-line. More specifically, a portion of the high-temperature and high-pressure refrigerant discharged from the compressor 9 is circulated to the outdoor heat exchanger 11 effects as evaporator so that outdoor heat exchanger 11 will be high temperature, and thus the defrosting operation of the outdoor heat exchanger 11 is started.

Figure 3:
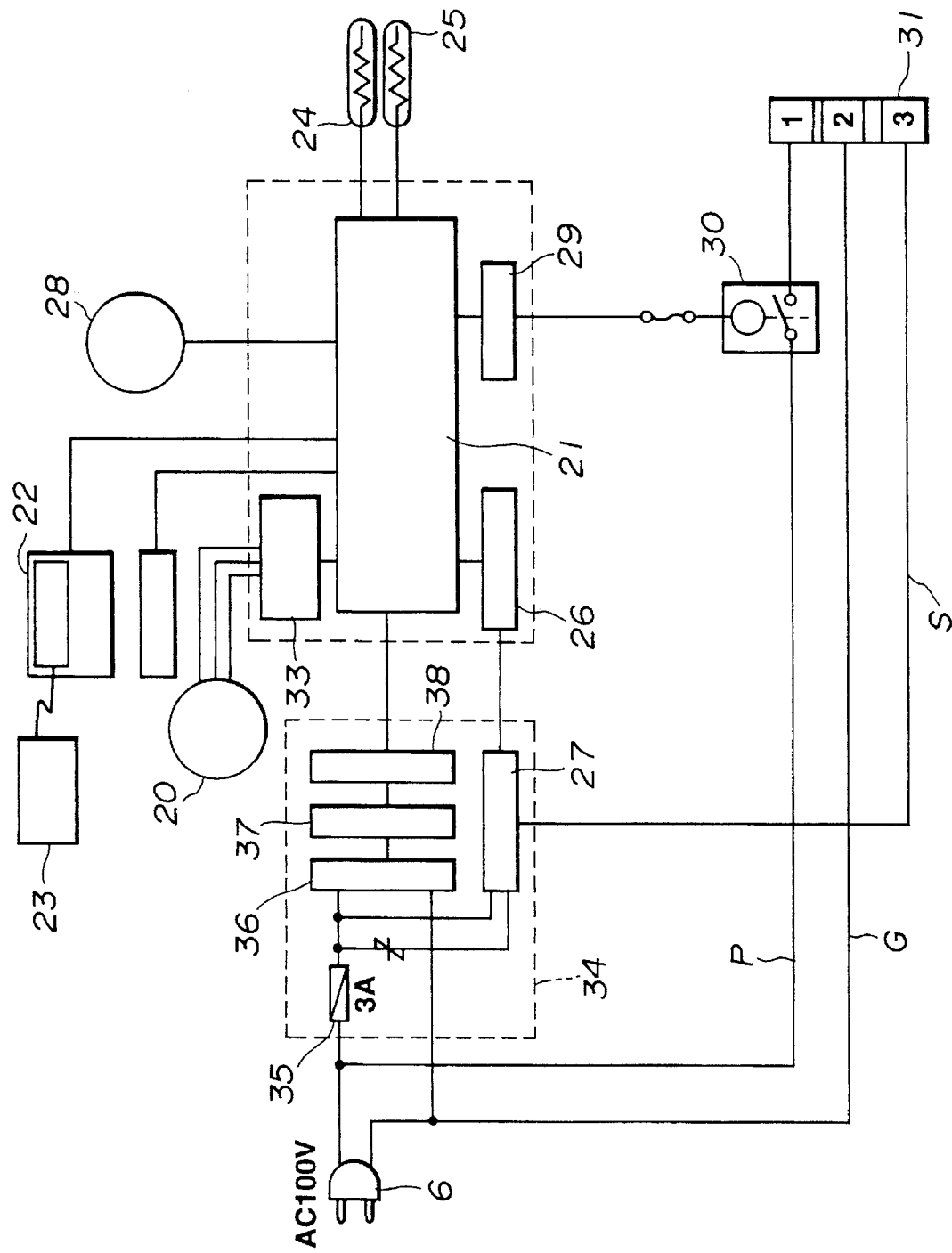
FIG. 3 is a block diagram showing a main portion of the electric circuit of the indoor unit shown in FIG. 1.

FIG. 3 is a block diagram showing a main portion of the electric circuit of the indoor unit 5 shown in FIG. 1. In this diagram, reference numeral 21 denotes a microprocessor (Intel Corp. make 87C196MC with programs stored therein), which executes programs stored in the internal ROM to control the air conditioner. The microprocessor 21, in executing the control, accepts control signals and the room temperature value transmitted from a remote controller 23 through its signal receiving portion and also accepts the suction air temperature of the indoor heat exchanger 15 detected by a room-temperature sensor 24, the temperature of the indoor heat exchanger 15 detected by a heat-exchanger temperature sensor 25, and, thereby, controls the blast quantity (number of revolutions of a DC fan motor) of the blower 20 and the rotating angle (the delivery angle of the conditioned air delivered from the indoor unit 5) and, at the same time, calculates the cooling capacity required by the air-conditioned room and outputs the signal indicative of the cooling capacity to the signal line 4 through serial circuits 26 and 27 (which are circuits for modulating a signal represented by H/L voltages to a signal at a predetermined baud rate and for demodulating a similar signal transmitted from the outdoor unit 1).

The electric line 4 is formed of a dedicated line for power P, a dedicated line for signal S, and a common line to power and signal G. Further, the serial circuit 27 connects one of the signal lines to the common line G.

Reference numeral 30 denotes a power relay, make and brake of the contacts of which are controlled by the output of the microprocessor 21 through a driver 29. When the contacts are made, AC power obtained from the plug 6 is supplied to the terminal 31. Reference numeral 33 denotes a motor driving circuit which is constructed of six power switching elements connected in a three-phase bridge. The switching elements are ON/OFF operated by signals from the microprocessor 21 and, thereby, the rotation of the DC fan motor is controlled. The microprocessor 21 first calculates the angle of rotation of the rotor from the change in induced voltage on a non-conducting stator winding and then obtains the aforesaid output signal on the basis of the angle of rotation (refer to U.S. Pat. No. 4,495,450).

Reference numeral 34 denotes a power board which includes a current fuse 35, a rectifier circuit 36, a driving power circuit 37 for the DC fan motor, and a controlling power circuit 38 for the microprocessor 21 and others.

Figure 4:
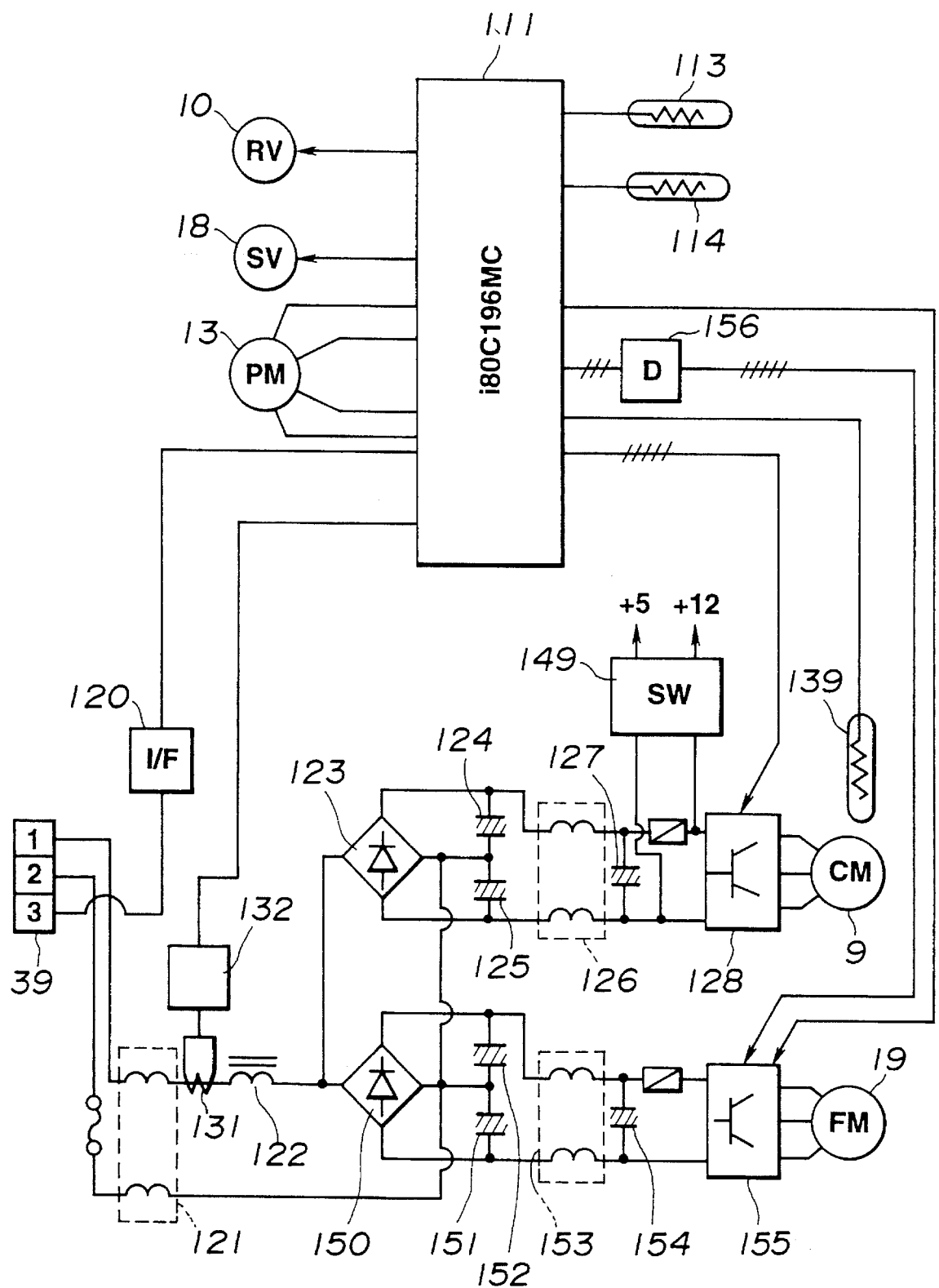
FIG. 4 is a general diagram showing the electric circuit of the outdoor unit shown in FIG. 1.

FIG. 4 is a general diagram showing the electric circuit of the outdoor unit 1 shown in FIG. 1. Terminal 39 is connected with the terminal 31 shown in FIG. 3 by signal lines with the terminal numbers agreeing with each other.

Reference numerals 113 and 114 are thermistors for detecting the outdoor air temperature and the temperature of the outdoor heat exchanger 11, respectively. Outputs of these thermistors 113 and 114 are linearized by outer circuits and then supplied to A/D conversion input terminals of a microprocessor 111 (Intel Corp. make i80C196MC). Thus, the microprocessor 111 is allowed to receive the outdoor air temperature and the temperature of the outdoor heat exchanger 11.

The microprocessor 111, upon receipt of the outdoor air temperature, executes programs stored therein in advance to control the draft quantity (number of revolutions) of an outdoor blower (motor) 19. The control is operated, in the room cooling operation, such that the number of revolutions of the motor 19 is increased according as the outdoor air temperature rises and, in the room heating operation, such that the number of revolutions of the motor 19 is increased according as the outdoor temperature lowers.

The four-way changeover valve 10 and the electromagnetic close/open valve 18 are ON/OFF controlled by a photo-triac (not shown) controlled by a signal from the microprocessor 111. The defrosting operation is started when relationships among the outdoor air temperature, the heat exchanger temperature, and the mask time satisfy predetermined conditions.

Reference numeral 120 denotes a serial signal circuit (interface circuit), which is an interface circuit for exchanging signals between the microprocessor 21 and the microprocessor 111.

In FIG. 4, single phase AC power of 100 V supplied from the terminal 39 is supplied to a full-wave rectifier circuit 123 through a noise filter 121 and a reactor 122. Reference numerals 124 and 125 denote smoothing capacitors, which, together with the rectifier circuit 123, constitute a voltage doubler rectifier circuit. Accordingly, DC power at approximately 280 V (at approximately 250 V, in reality, because of the voltage drop in the noise filter, etc.).

The DC power supplied through the voltage-doubling rectification is passed through a noise filter 126 and smoothed by a capacitor 127 and supplied to an inverter circuit 128. The inverter circuit 128 is formed of six power switching elements (power transistors, FETs, IGBTs, etc.). The switching elements make ON/OFF operations in accordance with ON/OFF signals (supplied from the microprocessor 111) obtained on the principle of the PWM system and supply three-phase AC power formed of a three-phase pseudo-sine wave to the compressor (three-phase induction motor) 9. Accordingly, the capacity (number of revolutions) of the compressor 9 can be determined by the frequency of the three-phase pseudo-sine wave.

Reference numeral 131 denotes a C. T. (current transformer) which detects the current of the AC power supplied from the terminal 39. The output of the C. T. 131 is converted to a DC voltage in a current detector circuit 132 and accepted by the microprocessor 111, the same as the detected temperatures by the thermistors 113 and 114, so that the current value is controlled by the microprocessor 111.

The microprocessor 111 corrects the frequency of the three-phase pseudo-sine wave to be decreased so that the detected current by the C. T. 131 may not exceed a set value, for example 15 A. More specifically, the frequency is lowered until the current becomes lower than 15 A. Thus, the current of the AC power supplied from the terminal 39 is prevented from exceeding 15 A.

Reference numeral 139 denotes a thermistor detecting the temperature of the compressor 9 at its portion where temperature becomes high. The microprocessor 111 corrects the frequency of the pseudo-sine wave to be decreased in order that the detected temperature will not exceed a preset temperature, for example 104. Thereby, a temperature rise in the compressor 9 due to overload can be prevented.

Reference numeral 149 denotes a switching power circuit which outputs stabilized low voltages of +5 V and +12 V.

Reference numerals 150 to 155 denote a rectifier circuit, smoothing capacitors, a noise filter, a smoothing capacitor, and an inverter circuit similar to those mentioned above. The inverter circuit 155 is supplied with ON/OFF switching signals from the microprocessor 111. Reference numeral 156 denotes a delay circuit which generates six kinds of switching signals from three kinds of switching signals output from the microprocessor 111 and also provides a delay when the switching signal changes from OFF to ON.

The inverter circuit 155 is supplied with a signal from the microprocessor 111 to turn OFF all the switching elements.

Figure 5:
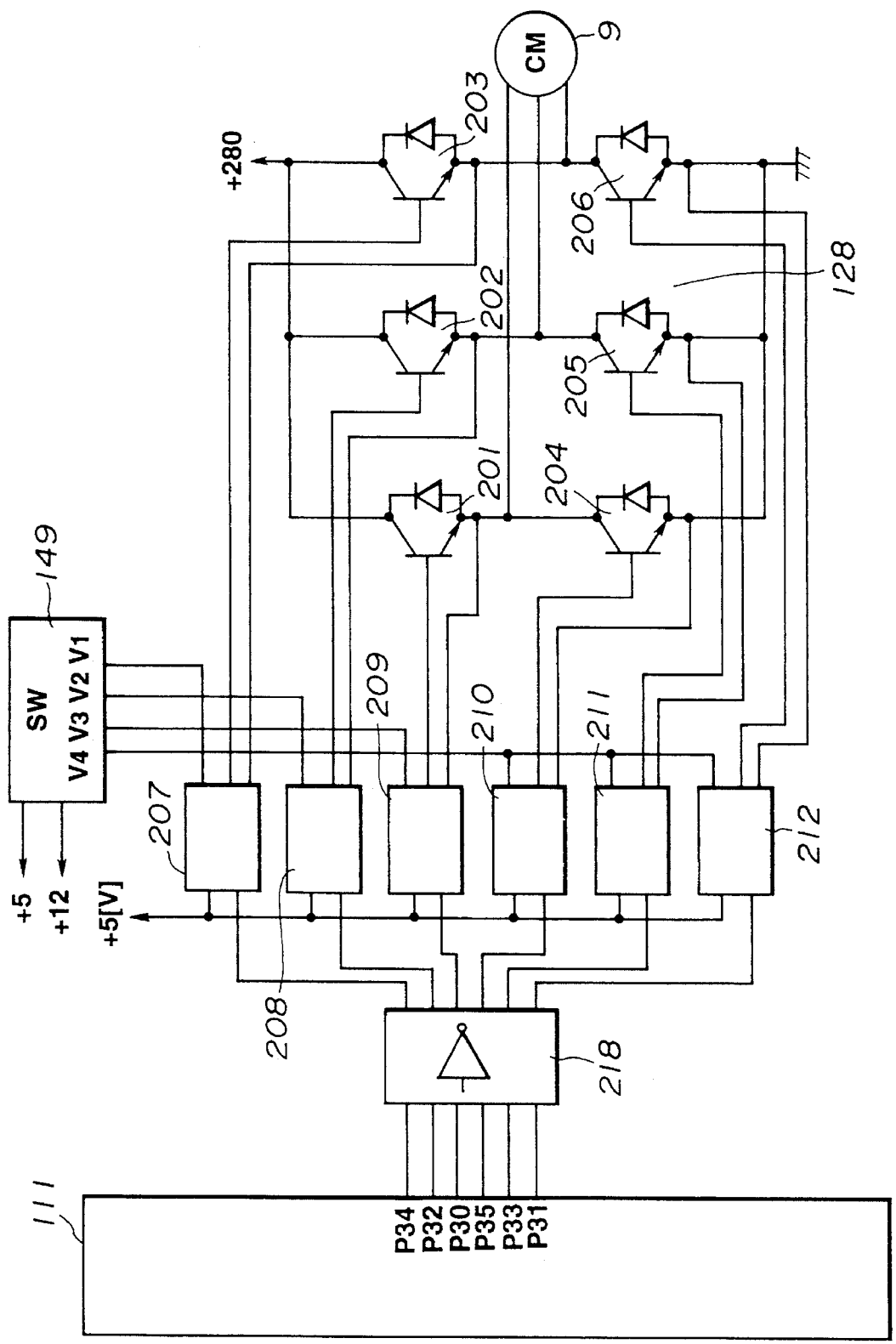
FIG. 5 is an electric circuit diagram showing a main portion of the general diagram shown in FIG. 4.

FIG. 5 is an electric circuit diagram showing a main portion of the general diagram shown in FIG. 4. In this diagram, reference numerals 201 to 206 denote the power switching elements which constitute the inverter circuit 128 and are so connected as to form a three-phase bridge.

Reference numerals 207 to 212 denote base driving circuits for the power switching elements 201 to 206. The base driving circuits 207 to 209 are supplied with power voltage +5 V for photocouplers and mutually insulated power voltages V1 to V3, while the base driving circuits 210 to 212 are supplied with the power voltage +5 V for photocouplers and a common power voltage V4. These power voltages +5 V and V1 to V4 are supplied from the switching power circuit 149. The voltages V1 to V4 are DC voltages at +6 V.

The base driving circuit is a circuit for allowing charges stored between the base and emitter of the power switching element to be discharged especially when the switching signal is changed from ON to OFF so that the power switching element is quickly turned OFF. The main portion of the base driving circuits 207 to 212 may be integrated to form a hybrid circuit. Further, they can be integrated into an inverter circuit 128, which is a molded module of a combination of six transistors. (As one of such modules, there is Sanyo Electric Co. make STK650-316.)

Reference numeral 218 denotes an inverting buffer which inverts, and amplifies for power, ON/OFF (H-level voltage/ L-level voltage) switching signals output from ports P30 to ports P35 of the microprocessor 111. Outputs from the inverting buffer 218 are supplied to corresponding base driving circuits 207 to 212.

The compressor 9 is driven by a three-phase pseudo-sine wave output from the inverter circuit 128. By changing the frequency of the pseudo-sine wave, the number of revolutions of the compressor 9 can be changed.

Figure 6:
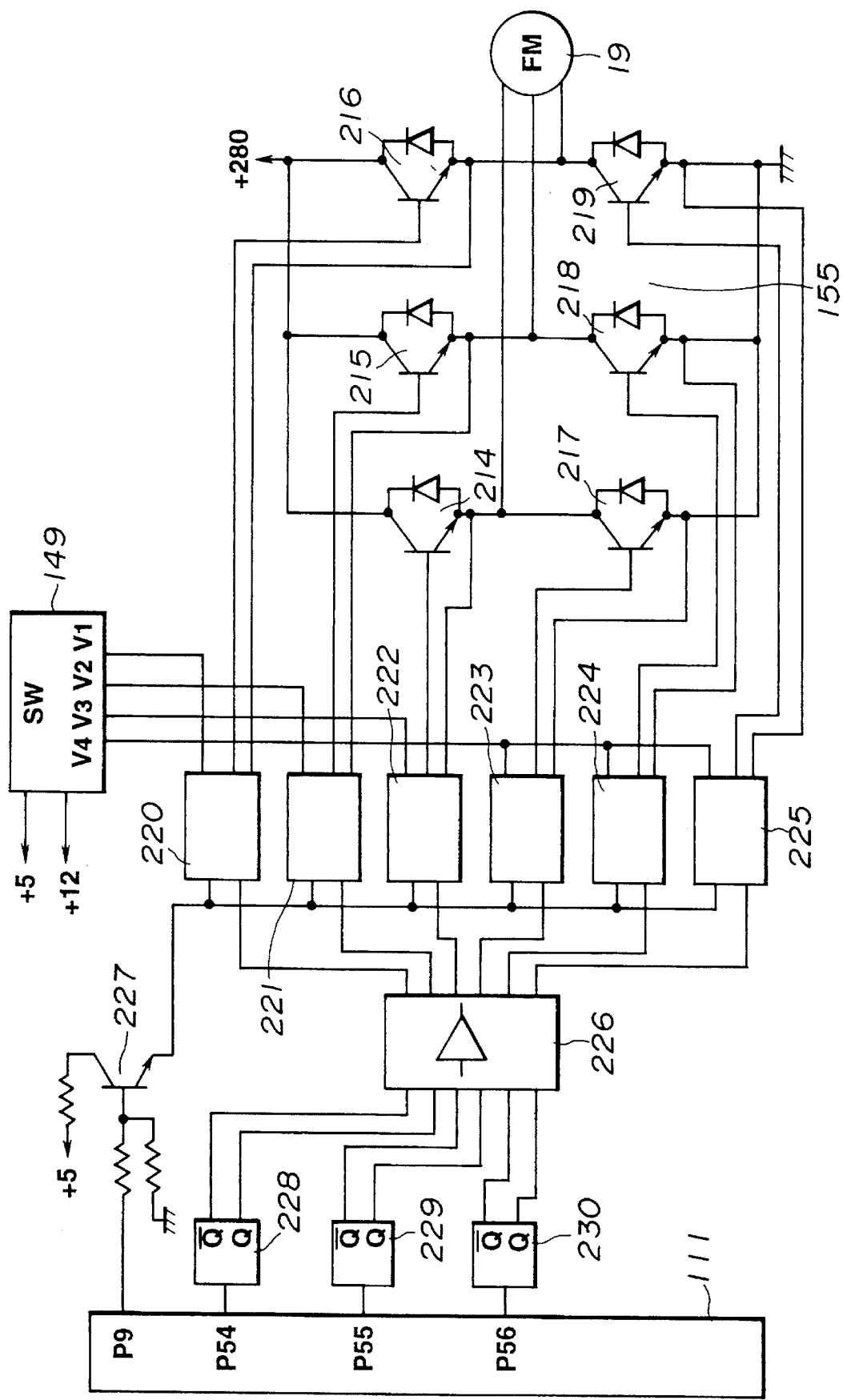
FIG. 6 is an electric circuit diagram similar to FIG. 5 showing a circuit for driving a blower (motor)

FIG. 6 is an electric circuit diagram similar to FIG. 5 showing a circuit for driving the blower (motor) 19. In this diagram, switching elements 214 to 219 correspond to the switching elements 201 to 206, base driving circuits 220 to 225 correspond to the base driving circuits 207 to 212, and a buffer (not inverting the output) 226 corresponds to the inverting buffer 218. The base driving circuits 220 to 225 are receiving power from the switching power circuit 149 similarly to the above.

Reference numeral 227 denotes a switching element which is turned ON by an ON signal from a port P9 of the microprocessor 111 and renders the photocouplers for the base driving circuits 220 to 221 operative. When the switching element 227 is OFF, the photocouplers do not operate and, hence, the switching elements 214 to 219 are all turned OFF.

Reference numerals 228 to 230 denote delay circuits (the delay circuit 156 in FIG. 4) which output switching signals (ON/OFF signals) output from ports P54 to P56 of the microprocessor 111 and inverted signals of the switching signals and, in addition, delay the transmission of signals a predetermined time period when the switching signals are changed from OFF to ON.

Figure 7:
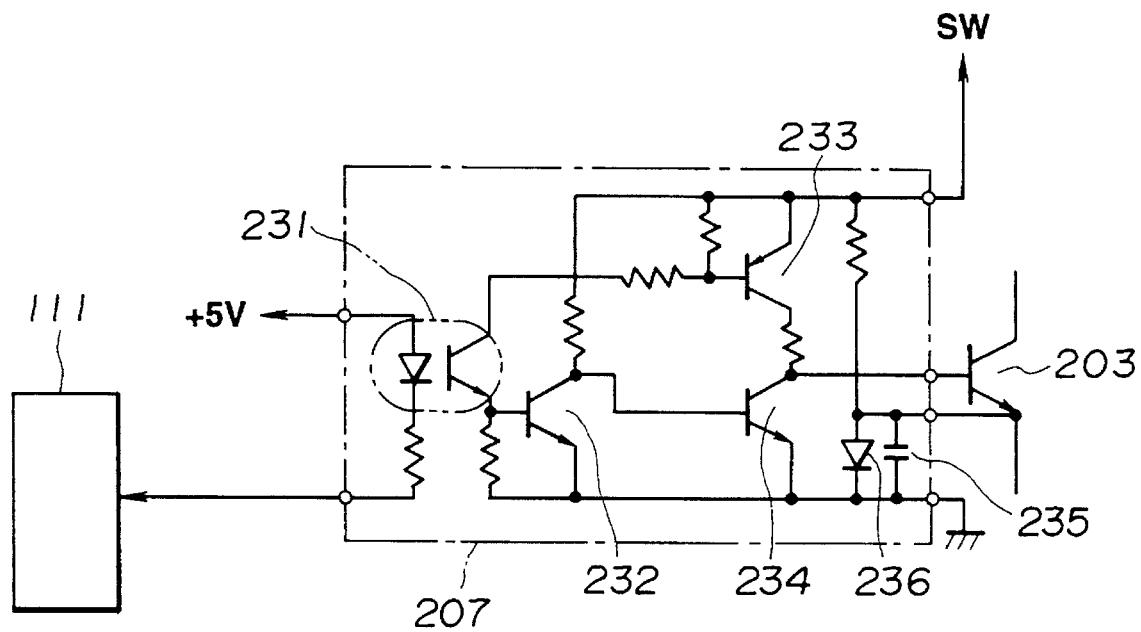
FIG. 7 is an electric circuit diagram showing a base driving circuit.

FIG. 7 is an electric circuit diagram showing the base driving circuit (for example 207). In this diagram, reference numeral 231 denotes a photocoupler which is turned ON/OFF by the switching signal from the microprocessor 111. Reference numeral 232 to 234 denote switching transistors, which turn ON/OFF a power transistor 203 by being turned ON/OFF by the switching signal. Since the transistor 234 is turned ON when the power transistor 203 is turned OFF, the potential of the base of the power transistor 203 becomes lower than the potential of the emitter by the amount corresponding to the terminal voltage of the capacitor 235 and, hence, the charges stored on the base are readily discharged. Incidentally, the terminal voltage of the capacitor 235 is correspondent to the forward voltage (approximately 0.7 V) of the diode 236. (Refer to the gazette of Japanese Utility Model Publication No. Hei 2-18710.) Since other base driving circuits are of the same circuit configuration, description of them will be omitted.

Figure 8:
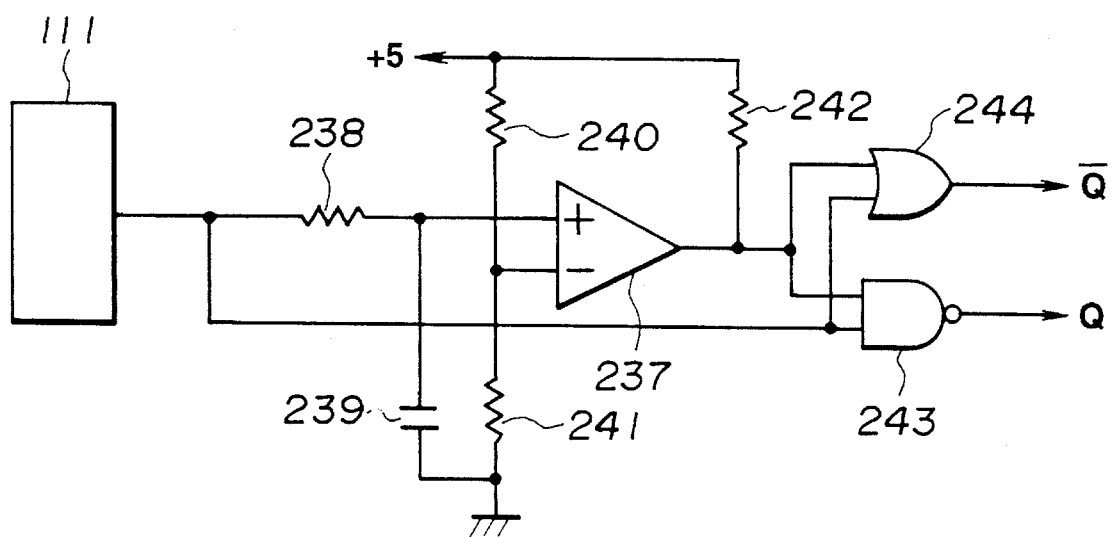
FIG. 8 is an electric circuit diagram showing a delay circuit.

FIG. 8 is an electric circuit diagram of the delay circuit 228 (other delay circuits 229 and 230 are the same in circuit configuration). In this diagram, reference numeral 237 denotes a comparator of which the noninverting input terminal is connected with an integrator circuit formed of a resistor 238 and a capacitor 239, and it is adapted such that a switching signal (ON: H voltage at +5 V, OFF: L voltage at 0 V) from the microprocessor 111 is supplied thereto through the integrator circuit. The inverting input terminal is supplied with a divided voltage (2.5 V) by resistors 240 and 241. Reference numeral 242 denotes the output resistor of the comparator 237. Reference numeral 243 denotes a NAND gate and 244 denotes an OR gate. Their respective outputs Q and Q are supplied to the buffer 226.

Figure 9:
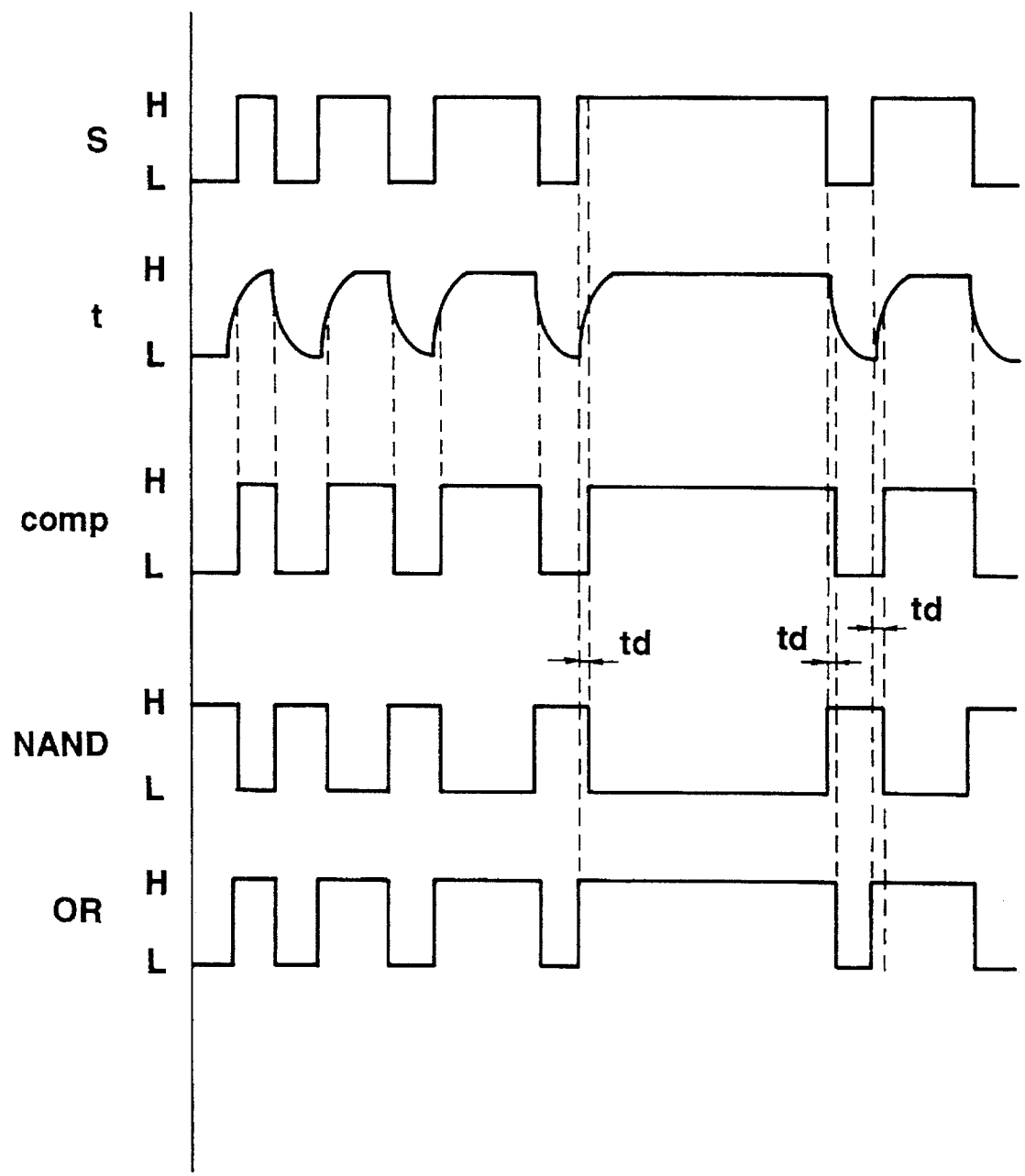
FIG. 9 is a time chart showing signal levels (H/L) at main portions of the delay circuit.

FIG. 9 is a time chart showing signal levels (H/L) at main portions of the delay circuit 228. Character S denotes the switching signal output from the microprocessor 111, + denotes the signal level supplied to the noninverting input terminal of the comparator 237 (the signal passed through the integrator circuit), COMP denotes the signal level of the output of the comparator 237, NAND denotes the signal level after being passed through the NAND gate 243, and OR denotes the signal level after being passed through the OR gate 244. As apparent from the time chart, there is secured a time difference td between the L output of the NAND gate 243 and the L output of the OR gate 244. By securing such a time difference, the upper and lower power switching elements constituting the inverter circuit are prevented from assuming ON states at the same time. The time difference td is obtained by the time constant of the integrator circuit and it is set to 10 μsec in the present embodiment.

Figure 10:
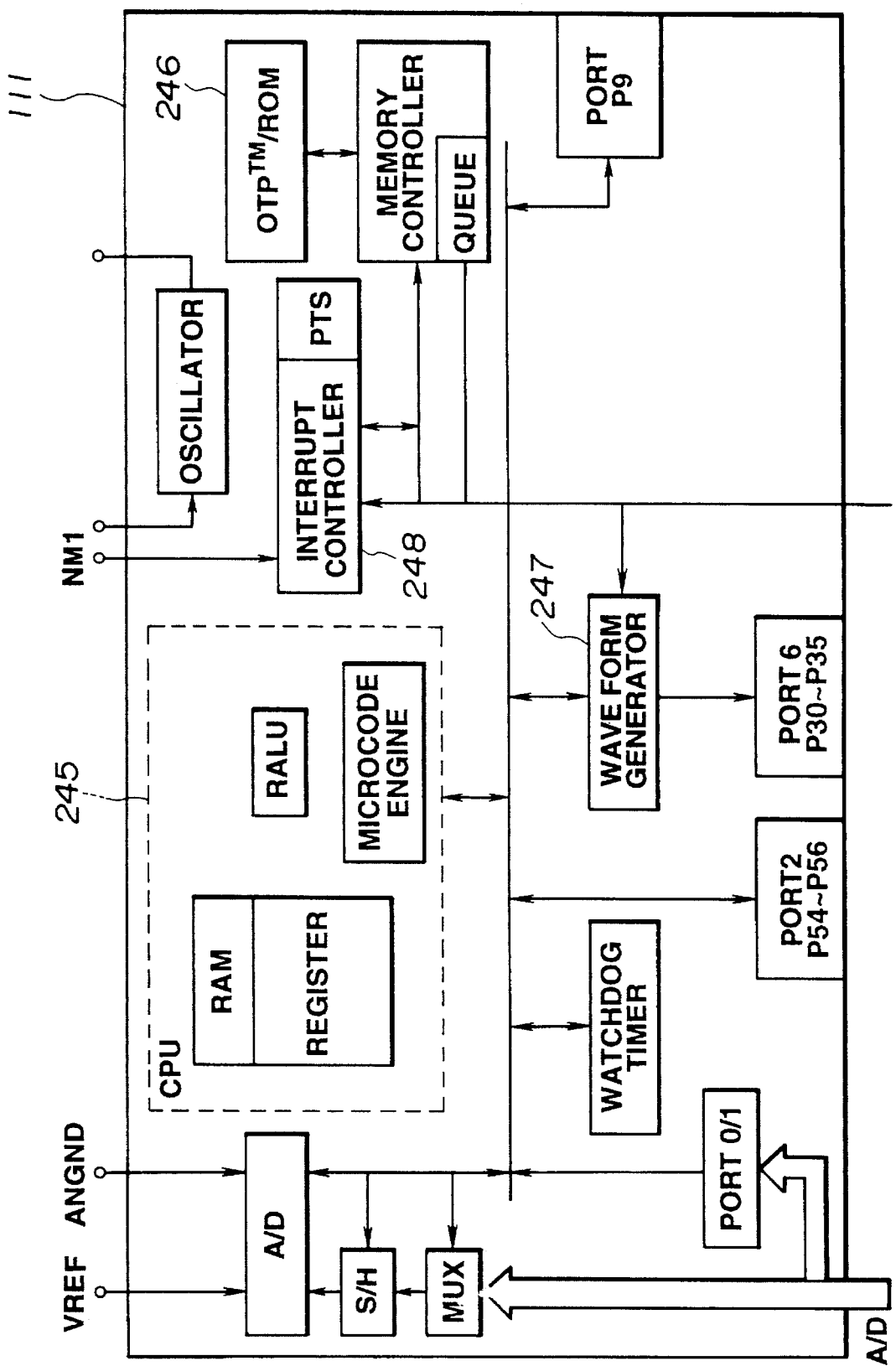
FIG. 10 is a block diagram showing a main structure of a microprocessor.

FIG. 10 is a block diagram showing a main structure of the microprocessor 111. In this diagram, reference numeral 245 denotes a CPU (processing unit), which operates in accordance with programs stored in ROM (memory unit) 246. Reference numeral 247 denotes a waveform generator, which, upon receipt of predetermined data, generates the switching signal for obtaining the pseudo-sine wave based on the PWM (pulse width modulation) system. Reference numeral 248 denotes an interrupt controller, which, at a count-out of a timer, outputs a signal to interrupt execution of a program.

Figure 11:
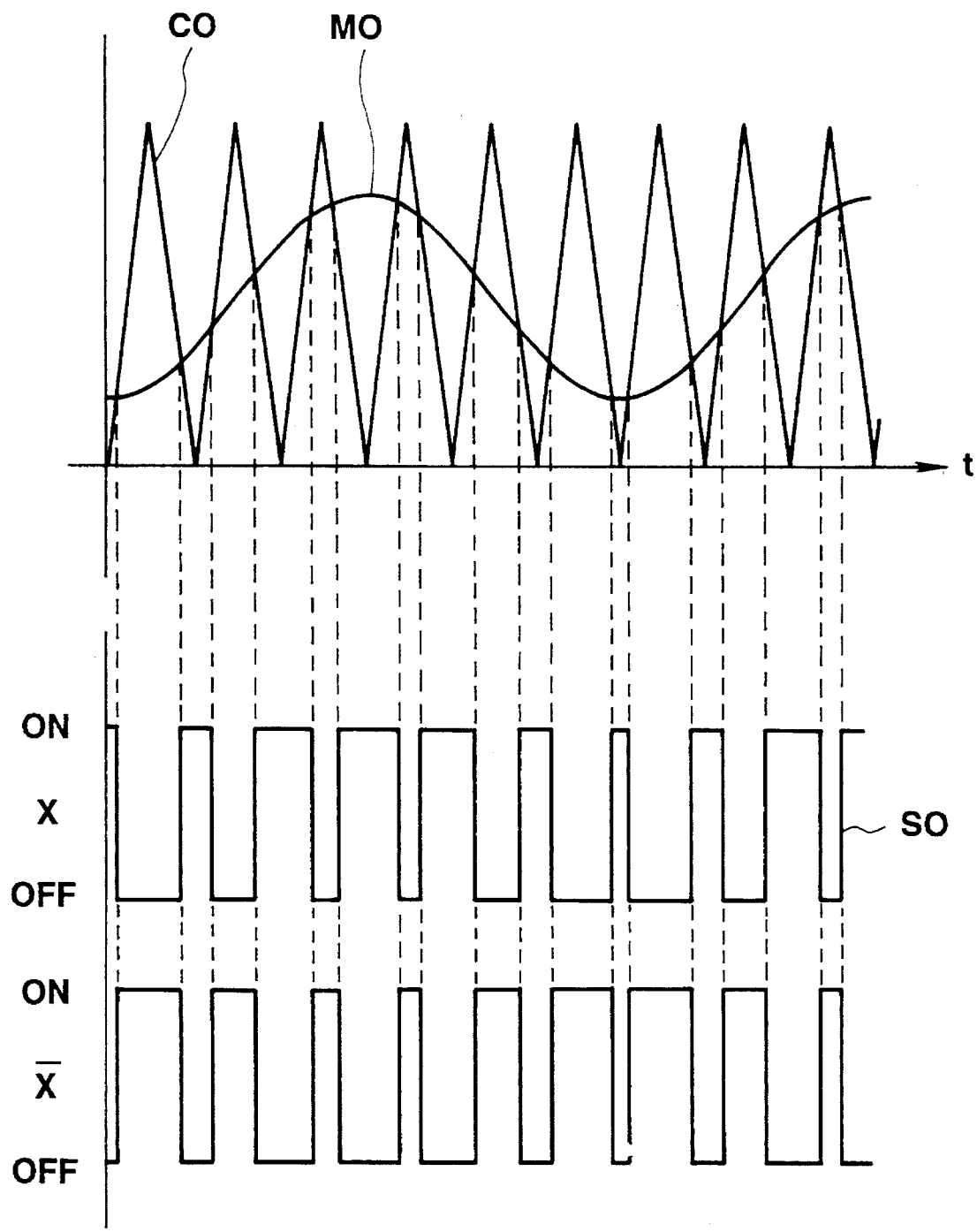
FIG. 11 is a diagram explanatory of the principle of generation of a switching signal by the microprocessor.

FIG. 11 is a diagram explanatory of the principle of generation of the switching signal by the microprocessor 111, i.e., a diagram explanatory of the provision of the ON/OFF signal for the switching element 201 shown in FIG. 5, for example. The ON/OFF signal for the switching element 204 is an inversion of the ON/OFF signal for the switching element 201.

In FIG. 11, C0 denotes the carrier wave (for example triangular wave, stepped triangular wave, and sine wave) and M0 denotes the modulating wave (for example sine wave and stepped sine wave). The frequencies of the carrier wave C0 and modulating wave M0 and the ratio between the frequencies are not limited to those illustrated. Frequencies shown in FIG. 11 are those selected for convenience of explanation. The ON/OFF signal S0 is such a signal that becomes ON when modulating wave M0>carrier wave C0.

The ON/OFF signal for the switching element 202 is an ON/OFF signal that is obtained depending on whether modulating wave M0>carrier wave C0, when the modulating wave M0 is advanced in phase by 120° from the modulating wave M0 of FIG. 11, and the ON/OFF signal for the switching element 205 is an inversion of the ON/OFF signal for the switching element 202. The ON/OFF signal for the switching element 203 is an ON/OFF signal that is obtained depending on whether modulating wave M0>carrier wave C0, when the modulating wave M0 is delayed in phase by 120° from the modulating wave M0 of FIG. 11, and the ON/OFF signal for the switching element 206 is an inversion of the ON/OFF signal for the switching element 203.

By using such ON/OFF signals as described above, DC power is ON/OFF controlled on the same pattern as the ON/OFF signal shown in FIG. 11 and, thereby, a pseudo-sine wave is generated. The period (cycle) of the modulating wave M0 is the same as that of the frequency signal f. By changing the cycle of the modulating wave M0, the frequency of the pseudo-sine wave can be changed. By decreasing the cycle of the carrier wave C0, the number of ON/OFF changes in one cycle of the pseudo-sine wave increases so that the resolution of the pseudo-sine wave is increased. In FIG. 11, the cycle of the carrier wave is made larger for convenience of explanation.

Figure 12:
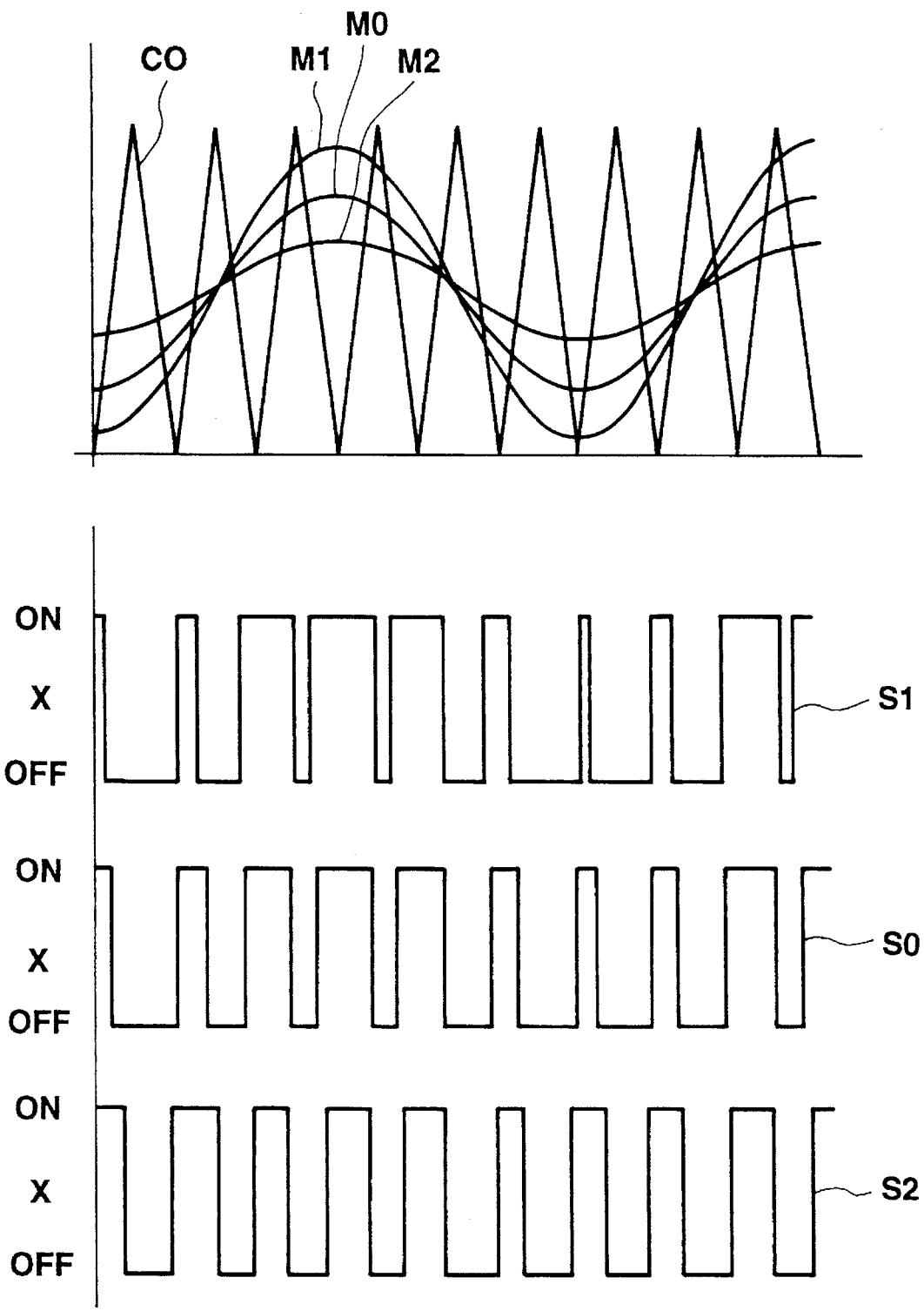
FIG. 12 is a diagram showing ON/OFF signals obtained when the amplitude of the modulating wave is changed.

FIG. 12 is a diagram showing ON/OFF signals obtained when the amplitude of the modulating wave is changed. In the case where a modulating wave M1 having a larger amplitude than the modulating wave M0 is used, the pseudo-voltage of the pseudo-sine wave S1 (the voltage value obtained from the current flowing through the compressor (motor) 9 when the pseudo-sine wave is applied to the induction motor) becomes higher. The difference between the maximum ON time and the minimum ON time, i.e., the amplitude of the voltage, becomes higher. In the case where the modulating wave M2 having a smaller amplitude than the modulating wave M0 is used, the pseudo-sine wave S2 is obtained. The pseudo-voltage obtained when the pseudo-sine wave S2 is used becomes smaller than the pseudo-voltage obtained when the pseudo-sine wave S0 is used.

Accordingly, by changing the amplitude of the modulating wave, the voltage of three-phase AC power supplied to the compressor 9 can be changed and by changing the frequency of the modulating wave, the frequency of the three-phase AC power can be changed.

Figure 13:
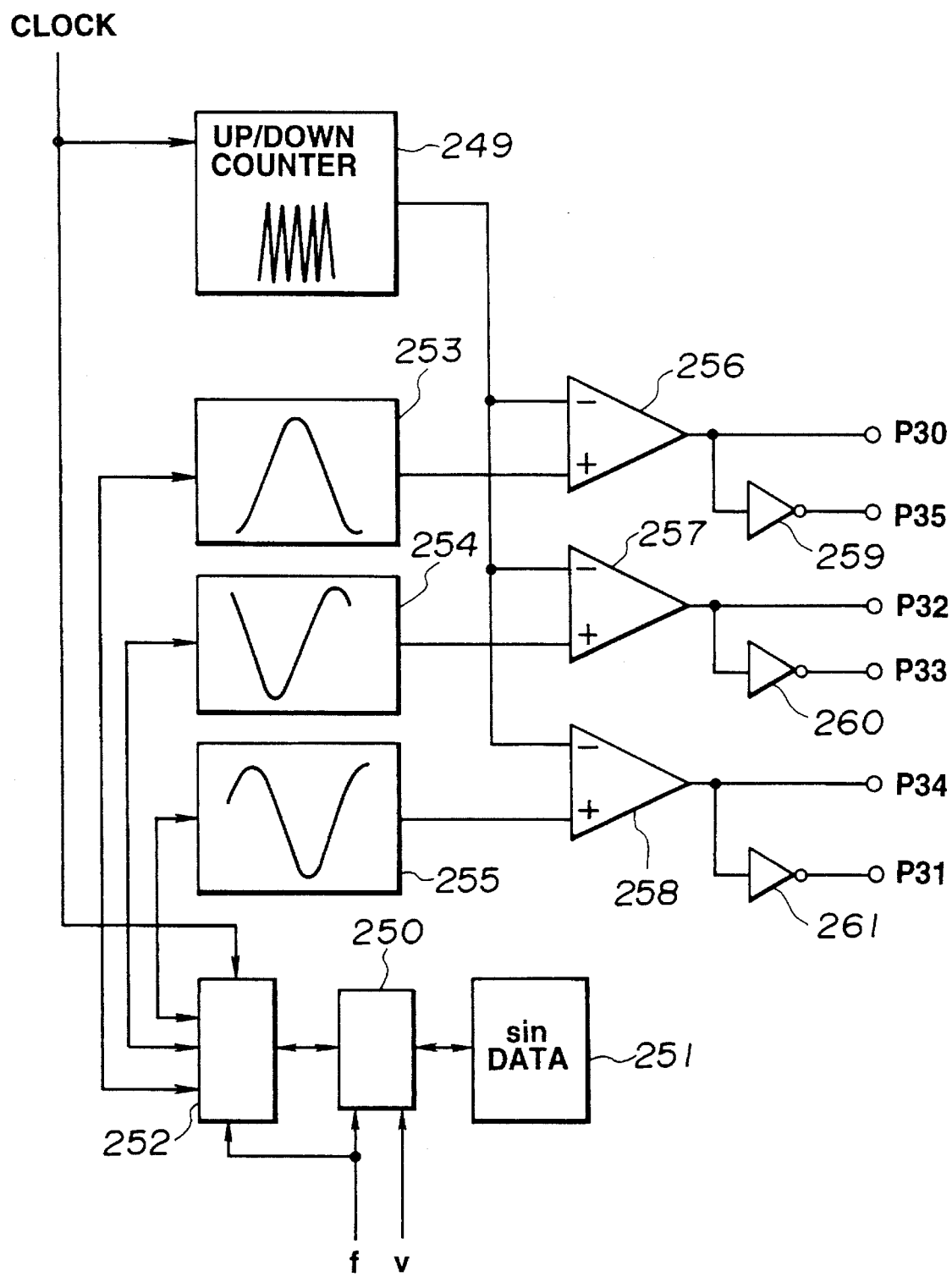
FIG. 13 is a block circuit diagram of a main portion within a waveform generator generating ON/OFF signals.

FIG. 13 is a block circuit diagram of a main portion within the waveform generator 247 generating ON/OFF signals. In this diagram, reference numeral 249 denotes a 16-bit UP/DOWN counter, which makes count-up in synchronism with a clock, and when the count reaches FFFFH, starts count-down in synchronism with the clock, and when the count reaches 0H, starts count-up again. Thus, it alternates the count-up and count-down. Hence, the output (count) of the counter 249 varies so as to form a triangular wave (carrier wave).

Figure 14:
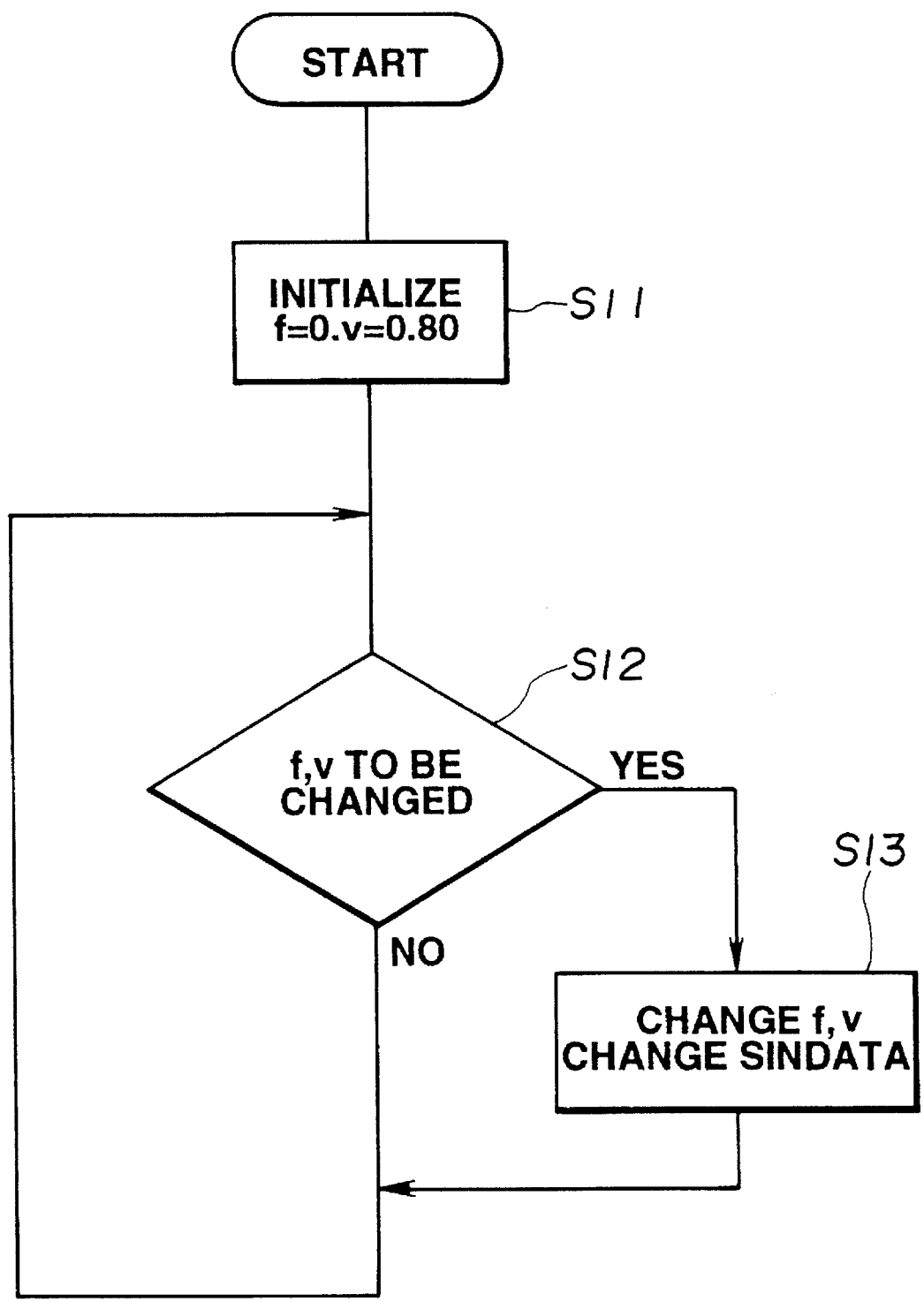
FIG. 14 is a flow chart for setting up frequency f and voltage v.

Reference numeral 250 denotes a sine wave control portion, which generates, in a storage area, a sine wave at the frequency f and voltage (amplitude) v with data changing from 0 to FFFFH. The generation of the sine wave is executed in accordance with a flow chart shown in FIG. 14. First in step S11, f and v are initialized (f=0, v=0.80). Although it is not limitative, f is set to be f=0 and $10 \leq f \leq 150$ Hz, and v is set to be $0.50 \leq v \leq 1.00$, for convenience of explanation.

Figure 15:
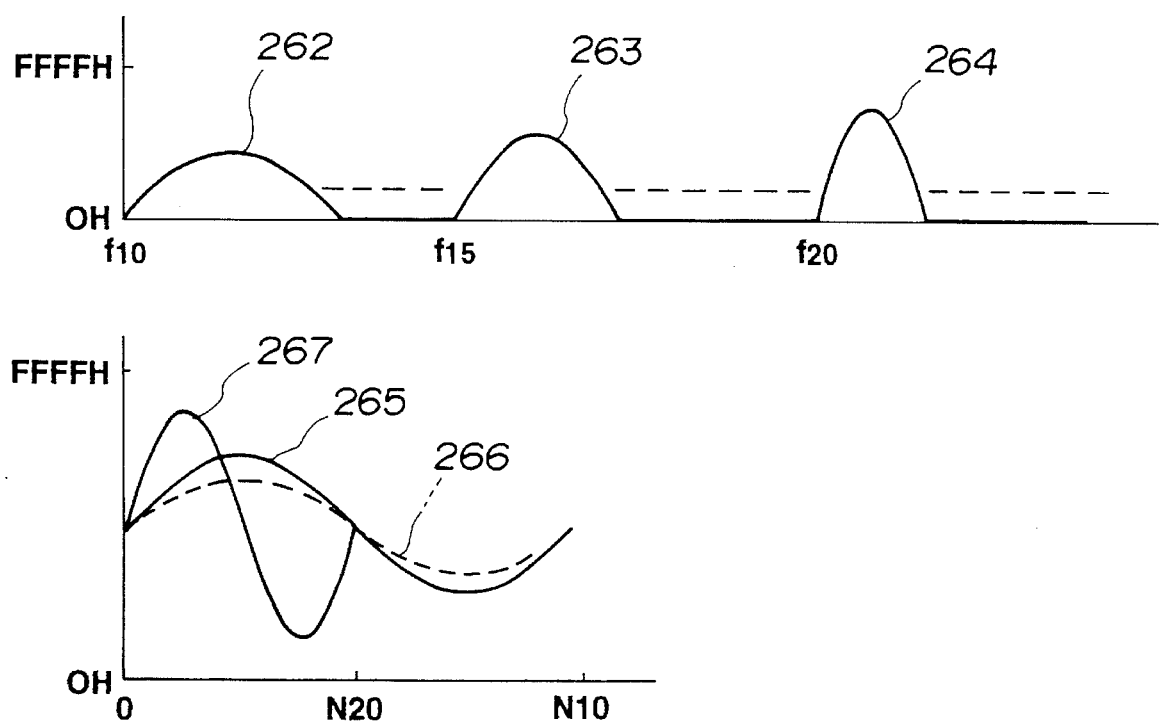
FIG. 15 is a diagram showing sine wave data in a storage area.

If it is judged necessary to change the frequency f or voltage v in step S12, the sine wave data in the storage area is rewritten in step S13. At this time, the sine wave data (sindata) is previously corrected by being multiplied by the value of v. The sine waves 265 to 267 in FIG. 15 show the sine wave data in the storage area. The sine wave 265 is the fundamental wave at f= 10 and v=1.00 and its value varying as shown in the diagram is stored at addresses 0 to N10. The sine wave 266 is the sine wave data when f=10 and V=0.66, while the sine wave 267 is the sine wave data when f=20 and v=1.00. The values of N10 and N20 are determined by the frequency of the clock used. When a clock at 100 KHz is used, for example, they become N10=10000 and N20=5000.

The sine waves (for ½ cycle) 262, 263, and 264 show the values (0H to FFFFH) of the sine wave data stored in a storage portion 251. There are stored sine wave data for each of frequencies in increment of 1 Hz in the storage portion 251. Characters f10, f15, and f20 denote points where the sine wave data start, respectively. The amplitude of the sine wave data is set to increase according as the frequency is increased. More specifically, it is set such that v/f is kept constant with respect to a preset load level.

For example, value of sine wave 265=FFFFH/2±sine wave 262/2, and value of sine wave 266=FFFFH/2±0.66×sine wave 262/2.

Likewise, other sine waves can be obtained. Namely, if frequency f and voltage v are given, the sine wave data in the storage area can be rewritten in step S13 of FIG. 14.

Although sine waves 262, 263, and 264 were shown for ½ cycle in FIG. 15 for ease of explanation, they can of course be cut to those for ¼ cycle to reduce the area occupied by them in the storage portion.

Reference numeral 252 in FIG. 13 denotes a distributor of the value of sine wave, which generates values of the waves with a phase difference of 120° therebetween. For example, in the case of the sine wave at f=10 and v=1.00 (the sine wave 265 shown in FIG. 15), its length of one cycle extends from 0 to N10 (=10000). The step positions shifted in phase by 120° are 0, N10/3=3333, and N10×⅔=6666.

Therefore, when the fundamental count (driven by the clock) is denoted by C, it becomes such that CX=C (0≦C≦N10=10000, C becomes C=0 when C=N10+1), CY=CX+N10/3 (CY becomes CY=CX+N10/3−N10=CX+3333−10000 when CY>N10=10000), and CZ=CX+N10×⅔ (CZ becomes CZ=CX+N10×⅔−N10=CX+6666−10000 when CZ>N10=10000).

The values of the sine wave corresponding to the counts CX, CY, and CZ correspond to the values of the sine wave 265 shown in FIG. 15. Hence, the changes of the sine wave when the value of the count C is changed become as shown by the waveforms 253, 254, and 255 in FIG. 13. The waveforms 253, 254, and 255 are mutually shifted in phase by 120°.

Although the sine waves 265 to 266 were shown for one cycle in FIG. 15 for ease of explanation, they may be reduced to those for ¼ cycle to save the storage area occupied by them.

Thus, if the values of the frequency f and voltage v are given, a three-phase sine wave at the frequency f and voltage v, of which phases are mutually shifted by 120°, can be obtained.

Referring back to FIG. 13, reference numerals 256 to 258 denote comparators for comparing magnitude of two values. Each comparator compares magnitude of the value of the triangular wave (carrier wave) supplied from the UP/DOWN counter 249 and the value of the sine wave (modulating wave) shown by the waveforms 253 to 255 and outputs an ON level (H level voltage) when the value of the modulating wave is larger than the value of the carrier wave. Outputs of the comparators 256 to 258 become the ON/OFF signals for the switching elements 201, 202, and 203 shown in FIG. 5.

Reference numerals 259 to 261 denote inverting circuits which invert the ON/OFF signals output from the comparators 256 to 258 to thereby provide ON/OFF signals for the switching elements 204, 205, and 206.

When the switching elements 201 to 206 are slow in making transition between ON/OFF states (especially, from ON state to OFF state), a delay circuit (which is a circuit, such as that shown in FIG. 8, for delaying the change, when the signal is changed from OFF to ON, for a predetermined time period,) is inserted in the circuit through which the ON/OFF signal is supplied to the switching element.

Incidentally, by D/A converting the values supplied to the comparators 256 to 258 into analog voltage levels, those comparators comparing magnitude of analog voltages may be used as the comparators 256 to 258.

The switching signals arranged as described above are output from the terminals P30 to P35 of the microprocessor 111. Thus, by having the values of the frequency f and voltage v stored into a predetermined register by the CPU 245, switching signals based on the PWM system can automatically be generated and output.

Figure 16:
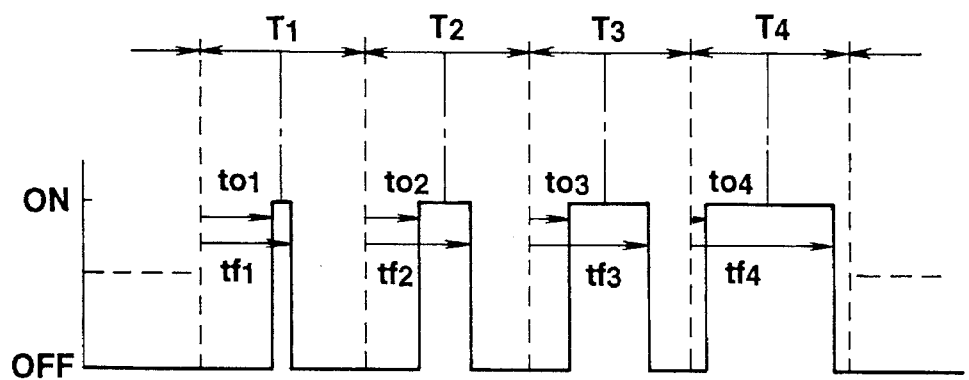
FIG. 16 is a diagram explanatory of generation of switching signals output from ports of the microprocessor.

FIG. 16 is a diagram explanatory of generation of switching signals output from the ports P54 to P56 of the microprocessor 111, which shows an ON/OFF switching signal for one power transistor (for example the switching element 214) of the six power transistors constituting the inverter circuit. By generating such switching signal for the three phases, a three-phase pseudo-sine wave can be obtained.

It is shown in FIG. 16 that the ON/OFF switching signal is generated once in each cycle of the carrier wave. Accordingly, a desired switching signal can be obtained by changing the timing of the ON/OFF switching signal in each cycle. In FIG. 16, each of T1 to T4 denotes one cycle and its period is T sec, which for example is around ⅓ k sec. Assuming that the ON/OFF switching signal is symmetric in each cycle of the carrier wave, if the times t0 (t01, t02, t03, and t04) are obtained, the times tf (tf1, tf2, tf3, and tf4) can be obtained from tf=T−t0.

Figure 17:
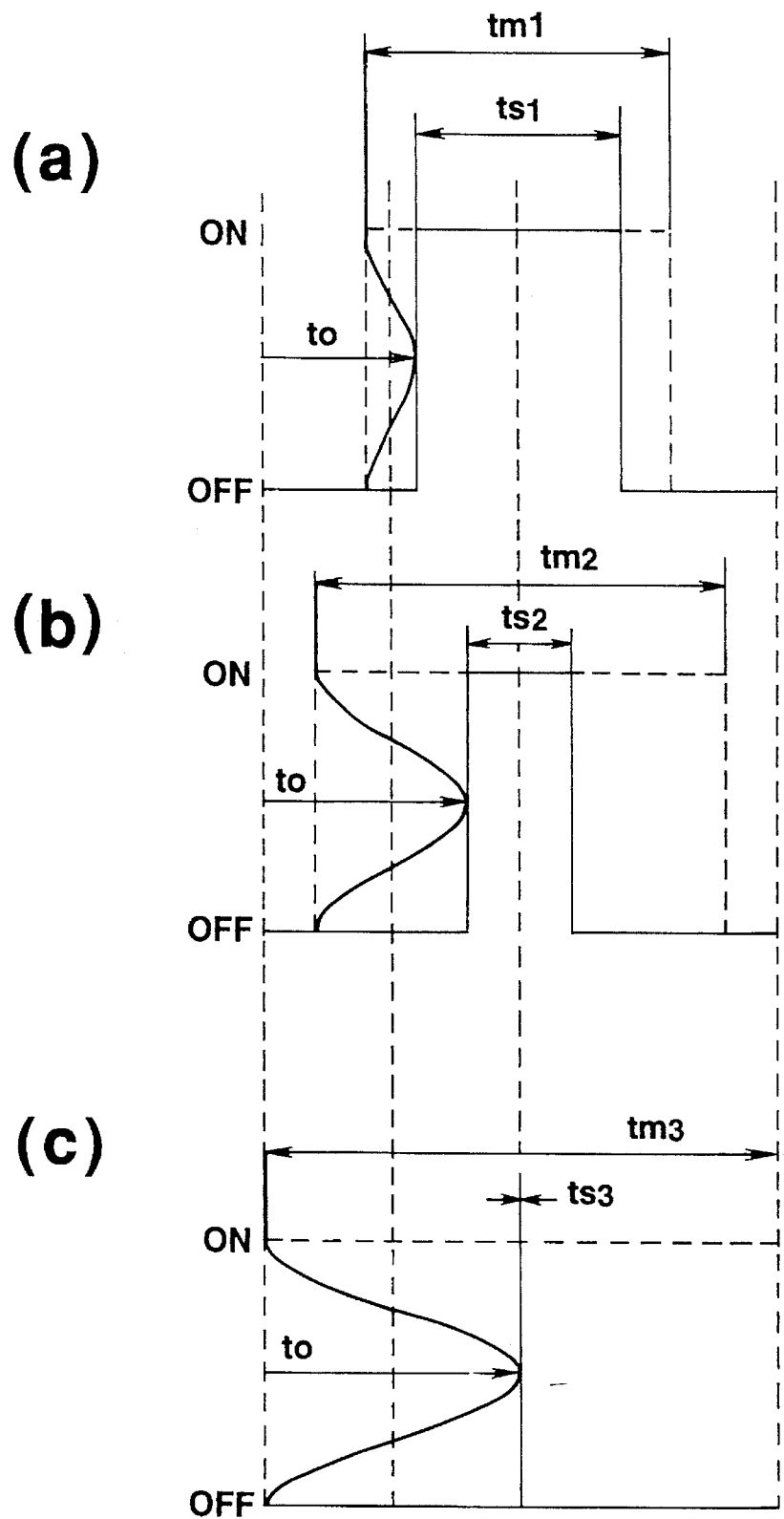
FIG. 17 is a diagram showing changes of the switching signal.

The pseudo-sine wave based on the PWM system can be obtained by changing the period of time (tf−t0), during which the ON switching signal is output, so as to take on a sine wave form. Accordingly, the point of time at which the switching signal changes from OFF to ON in one cycle of the carrier wave may be set to t0=A×sin(wt)+T/4. A is a constant and t0 changes as shown in FIG. 17. In FIG. 17, (a) shows the ON/OFF switching signal when the constant A is set small and (b) and (c) show the signal when the constant A are progressively increased.

According as the constant A is enlarged, the changing width of the period of time, ts1–tm1 (ts2–tm2, ts3–tm3), during which the switching signal is ON, becomes larger. Namely, the amplitude of the pseudo-sine wave becomes larger and, hence, the equivalent voltage of the three-phase AC power supplied to the induction motor can be made larger.

Accordingly, by changing the value of the constant A, the voltage can be controlled. By increasing wt, the rate of change, the frequency of the pseudo-sine wave can be changed. By introducing such a method from programs and executing relative operations in the microprocessor, ON/OFF switching signals can be obtained. The switching signals are output from the ports P54 to P56 of the microprocessor 111.

The method of generating pseudo-sine waves is not limited to that described in the above embodiment, but any other method is applicable if it is only possible to change the frequency and the equivalent voltage of the pseudo-sine wave.

Figure 18:
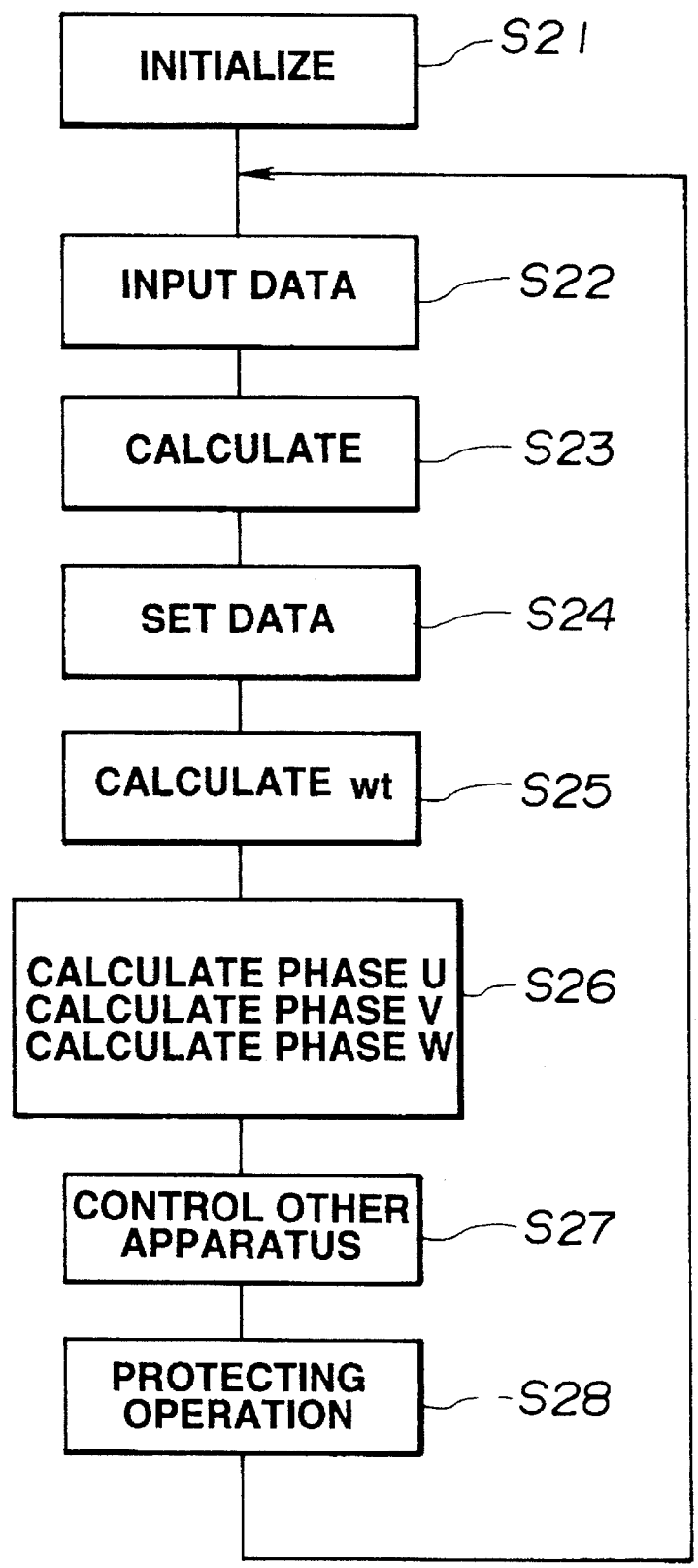
FIG. 18 is a flow chart showing the main operation (main routine) of the microprocessor.

FIG. 18 is a flow chart showing the main operation (main routine) of the microprocessor 111. In this flow chart, step S21 is a step in which the microprocessor 111 is initialized. In step S22, data are input. More specifically, such data as temperatures detected respectively by means of the thermistors 113, 114, and 139, the current value detected by means of the C. T. 131, and operational data supplied through the terminal 39 and interface circuit 120 are input.

In step S23, the frequency of the power supplied to the compressor 9 and the frequency of the power supplied to the blower 19 are obtained by calculation made on the above mentioned input data. In step S24, the frequency f and voltage v of the power supplied to the compressor 9 are stored in a predetermined storage portion. Hence, the waveform generator 247, on the basis of the frequency f and voltage v, automatically outputs the switching signals from the ports P30 to P35 of the microprocessor 111.

In step S25 and step S26, operations are performed for outputting the switching signals from the ports P54 to P56 of the microprocessor 111. First, the value of wt is set up. The value of wt is changed every cycle of the carrier wave. When a flag AU or BU (for the U phase), to be described later, is set, the next value of wt is obtained and, then, step S26 is executed, i.e., timing of ON/OFF changes in the next interval (the period of one cycle of the carrier wave) is obtained and the same is set in a timer time area, to be described later, and the flag is cleared. The same operations are performed on a flag AV or BV (for the V phase) and a flag AW or BW (for the W phase).

In step S27, operations of the four-way changeover valve 10 and the like are controlled on the basis of the input data. Further, it is determined in step S28 whether or not any protecting operation for the input data is necessary and, when it is necessary, a predetermined protecting operation is performed and a related indication is made.

Figure 19:
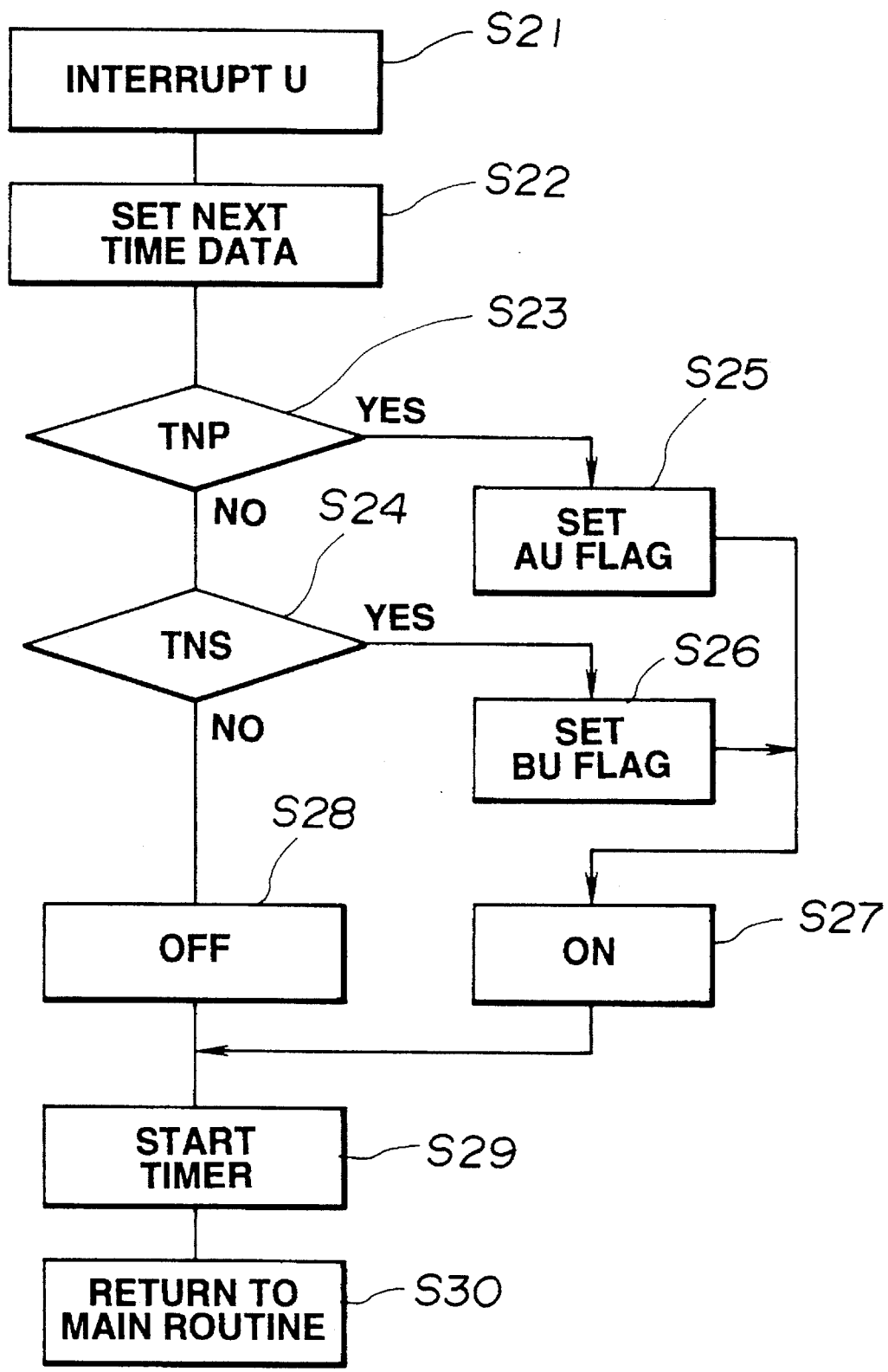
FIG. 19 is a flow chart showing processes executed when an interrupt occurs.

FIG. 19 is a flow chart showing the processes executed when an interrupt occurs. The interrupt occurs when each timer (U, V, and W) counts out a set time. Although description will be made below on only the U phase, the same operations are made for other phases.

When an interrupt occurs in step S21 (when a set time is counted out), a predetermined process is executed and the main routine (of the flow chart in FIG. 18) is transferred to this flow chart. In the following step S22, the next timer times are set in the timer U. Such timer times are set in timer time areas, i.e., TNP (ON time), TFP (OFF time), TNS (ON time), and TFS (OFF time) shown in FIG. 20. The set time in the timer U passes from left to right in FIG. 20.

These times are calculated in the main routine in accordance with the flag that is set.

In step S23 and step S24, it is determined whether or not the time set in step S22 is set in the area TNP or area TNS. When it is set in the TNP area, the flag AU is set (step S25) and when it is set in the TNS, the flag BU is set (step S26). Then, in step S27, the output at the port is set to ON and held at it. When the conditions in step S23 and step S24 are not met, then, in step S28, the output at the port is set to OFF and held at it.

Then, in step S29, counting of the time set in the timer U in step S22 is started and this routine is returned to the main routine in step S30.

Figure 20:
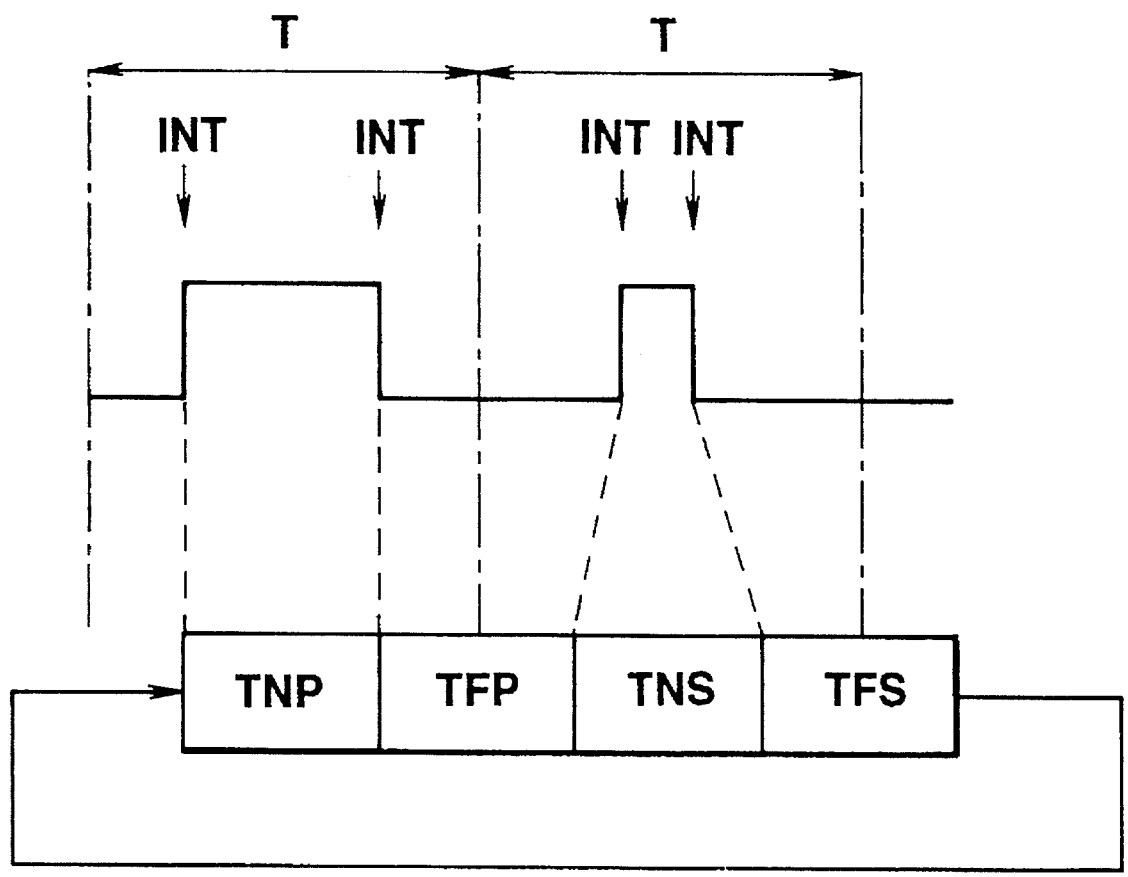
FIG. 20 is a diagram explanatory of relationships between time areas of a switching signal.

FIG. 20 is a diagram explanatory of ON/OFF changes at the port. In this diagram, T denotes one cycle of the carrier wave. At the first interrupt (INT), the port is turned ON and at the same time the timer U starts the counting of the time TNP. Since, the flag AU is set at this time, next wt (period of one cycle of the carrier wave) is calculated in the main routine and, thereby, OFF period, ON period, and OFF period in the next cycle wt are obtained. The first OFF period is added to the time TFP, the ON period is set in the time area TNS, and the last OFF period is set in the time area TFS. In the next interrupt (INT), the port is turned OFF and at the same time the timer U starts counting of the time TFP.

In the next interrupt (INT), the port is turned ON and, at the same time, the timer U starts the counting of the time TNS. Since, at this time, the flag BU is set, next wt (period of one cycle of the carrier wave) is calculated in the main routine and, thereby, OFF period, ON period, and OFF period in the next cycle wt are obtained. The first OFF period is added to the time TFS, the ON period is set in the TNP area, and the last OFF period is set in the TFP area. In the next interrupt (INT), the port is turned OFF and at the same time the timer U starts counting of the time TFS.

Thereafter, while the times TNP, TFP, TNS, and TFS are sequentially set up in the main routine, the port is turned ON/OFF every time an interrupt occurs and, thereby, the switching signals are obtained.

In the embodiment described above, a method obtaining switching signals by means of discretionary hardware circuits and a method obtaining switching signals by utilizing timer times set by programs are used for obtaining switching signals based on the PWM system for two kinds of motors. However, it may be adapted such that both sets of switching signals may be obtained by using hardware circuits or they may be obtained from the changes in the timer time. Further, it may be adapted such that more than two sets of switching signals are obtained.

Although the compressor 9 was constituted of a three-phase induction motor in the above embodiment, the same may be constituted of a DC motor and arranged to be operated by switching signals based on U.S. Pat. No. 4,495,450 generated in the same way as those for the blower 19.

Further, the compressor can be constituted of a DC motor and arranged to generate switching signals to control supplying electric power to said motor.

Further, the switching signal generated according to the present invention may be supplied not only to the motors but also for example to the switching power circuit 149 of FIG. 4 and the like.

According to the invention as described above, plural systems of switching signals can be obtained from a single microprocessor and, further, six kinds of switching signals can be obtained from three kinds of switching signals by means of circuits external to the microprocessor, and therefore, the number of ports used of the microprocessor can be decreased and the effective use of the ports can be achieved.

Further, using a single microprocessor, a plurality of motors and other electric apparatuses can respectively be driven by plural sets of outputs provided by the microprocessor.

Further, the switching signal obtained from a single microprocessor is not limited to the combination of 3 kinds of switching signals and 6 kinds of switching signals. It can be use in any style according to the faculties and number of the port of said microprocessor.

What is claimed is:

1. An apparatus for driving first and second motors each having three phase windings comprising:

respective switching elements for supplying power intermittently to each of said three windings of said first and second motors in response to switching signals;

a microcomputer having a first signal generator for outputting switching signals to said switching elements for said first motor and a second signal generator for outputting switching signals to said switching elements for said second motor;

said first signal generator having a program stored in an internal ROM for creating the switching signals outputted by said first signal generator based on the program data stored in said ROM;

said second signal generator having means for creating three sine waveforms, means for creating a carrier waveform, and means for modulating said three sine waveforms with said carrier waveform to produce the switching signals outputted by said second signal generator; and said microcomputer further comprising controlling means for controlling said first motor and said second motor by utilizing said first signal generator and said second signal generator.

2. An apparatus for driving two motors according to claim 1, wherein:

said first signal generator produces three types of switching signals and said second signal generator produces a first set of six types of switching signals, inverting means for producing a second set of six types of switching signals from said three types of switching signals produced by said first signal generator, and each of said first and second sets of six types of switching signals being supplied to said switching elements connected to a respective one of said first motor and said second motor.

3. An apparatus for driving two motors according to claim 2, wherein said switching elements comprise switching transistors.

4. An apparatus for driving two motors according to claim 3, wherein:

each said switching signal includes an ON signal state for turning on a respective one of said switching transistors and an OFF signal state for turning off said switching transistor, and a circuit to delay the change of the switching signal to the ON state from the OFF signal state.

5. An apparatus for a refrigerator having a compressor and a blower for driving first and second motors each having three phase windings, comprising:

a first motor for driving one of the compressor and the blower, and a second motor driving the other of the compressor and blower, the compressor being connected in a refrigeration cycle including a heat source side heat exchanger, an expansion device, a user side heat exchanger connected by a refrigerant pipe for supplying air which is temperature controlled by said user side heat exchanger to a space by said compressor, and the blower being arranged for controlling components beside the heat source side heat exchanger, switching elements for supplying power intermittently to said windings of said first and second motors by responding to the switching signals, a microcomputer having:

a first signal generator outputting switching signals to said switching elements for said first motor, said first signal generator having a program stored on an internal ROM for creating said switching signals outputted by said first signal generator based on data stored on said ROM, a second signal generator outputting switching signals to said switching elements for said second motor, said second signal generator having means for creating three sine waveforms, means for creating a carrier waveform and means for modulating said three sine waveforms and said carrier waveform to form said switching signals outputted by said second signal generator; and means for controlling said first motor and said second motor by utilizing said first signal generator and said second signal generator responsive to a condition of the refrigerator.

6. An apparatus according to claim 5, wherein said first motor drives the blower, and said second motor drives the compressor.

7. An apparatus according to claim 5, wherein said condition of the refrigerator is the temperature of a space to be temperature controlled.

* * * * *